United States Patent [19]

Hall, Jr.

[11] 4,253,164
[45] Feb. 24, 1981

[54] MULTI-PURPOSE SEISMIC TRANSDUCER

[75] Inventor: Ernest M. Hall, Jr., Houston, Tex.

[73] Assignee: Western Geophysical Co. of America, Houston, Tex.

[21] Appl. No.: 956,476

[22] Filed: Oct. 30, 1978

[51] Int. Cl.³ .......................... G01V 1/16; G01V 1/38
[52] U.S. Cl. ........................................ 367/22; 367/21; 367/38; 367/43; 367/49; 362/63; 362/135; 362/178; 362/180
[58] Field of Search ....................... 367/21, 22, 38, 43, 367/45, 46, 49, 62, 63, 65, 135, 167, 172, 177, 178, 180, 903

[56] References Cited

U.S. PATENT DOCUMENTS

| | | | |
|---|---|---|---|
| 3,281,768 | 10/1966 | Pavey, Jr. et al. | 367/21 |
| 3,412,374 | 11/1968 | Mitchell | 367/65 |
| 3,555,503 | 1/1971 | Morris | 367/180 |
| 3,863,200 | 1/1975 | Miller | 367/65 |
| 3,911,388 | 10/1975 | Crump et al. | 367/180 |
| 3,939,468 | 2/1976 | Mastin | 367/65 |

Primary Examiner—Howard A. Birmiel
Attorney, Agent, or Firm—William A. Knox

[57] ABSTRACT

A multi-purpose seismic transducer includes a first seismic sensor having a first transfer function. A transfer-function shaping filter is coupled to the output of the first seismic sensor. The filter is adjustable to shape the first transfer function to match a plurality of different second transfer functions.

10 Claims, 6 Drawing Figures

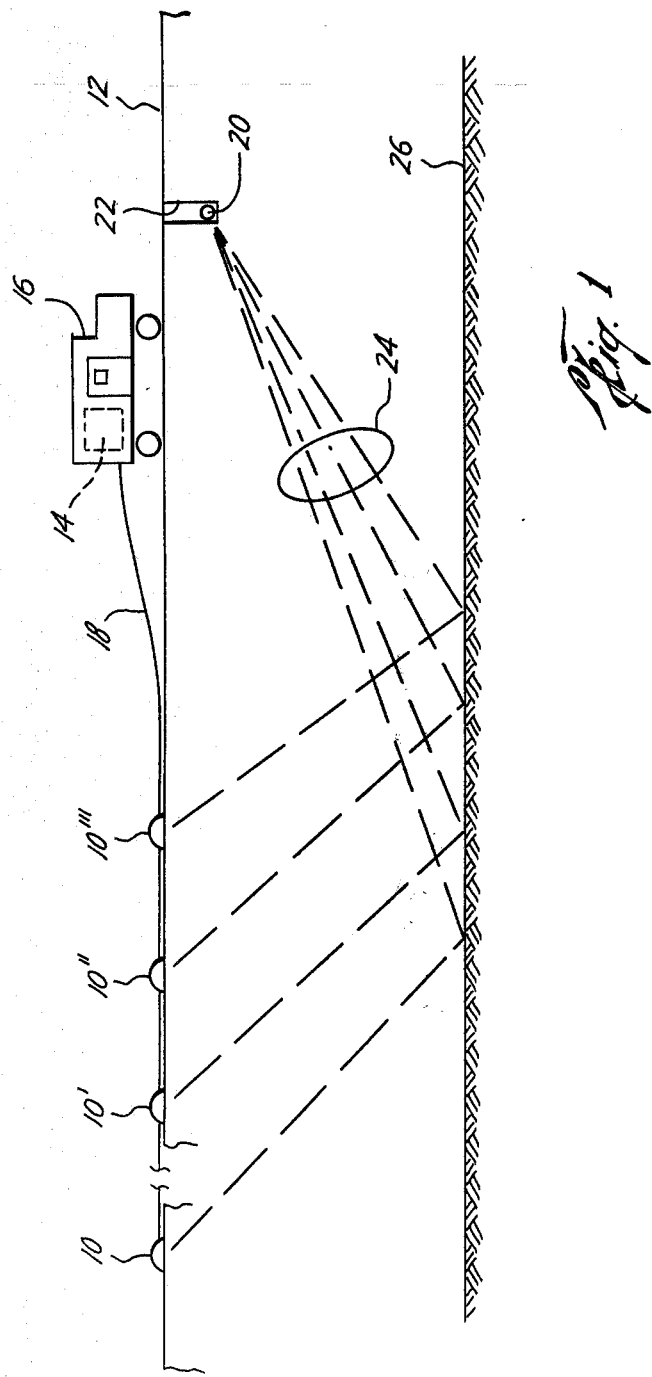
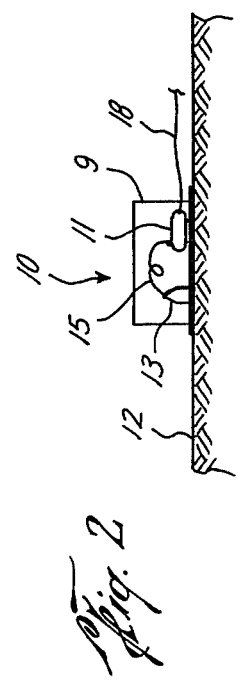

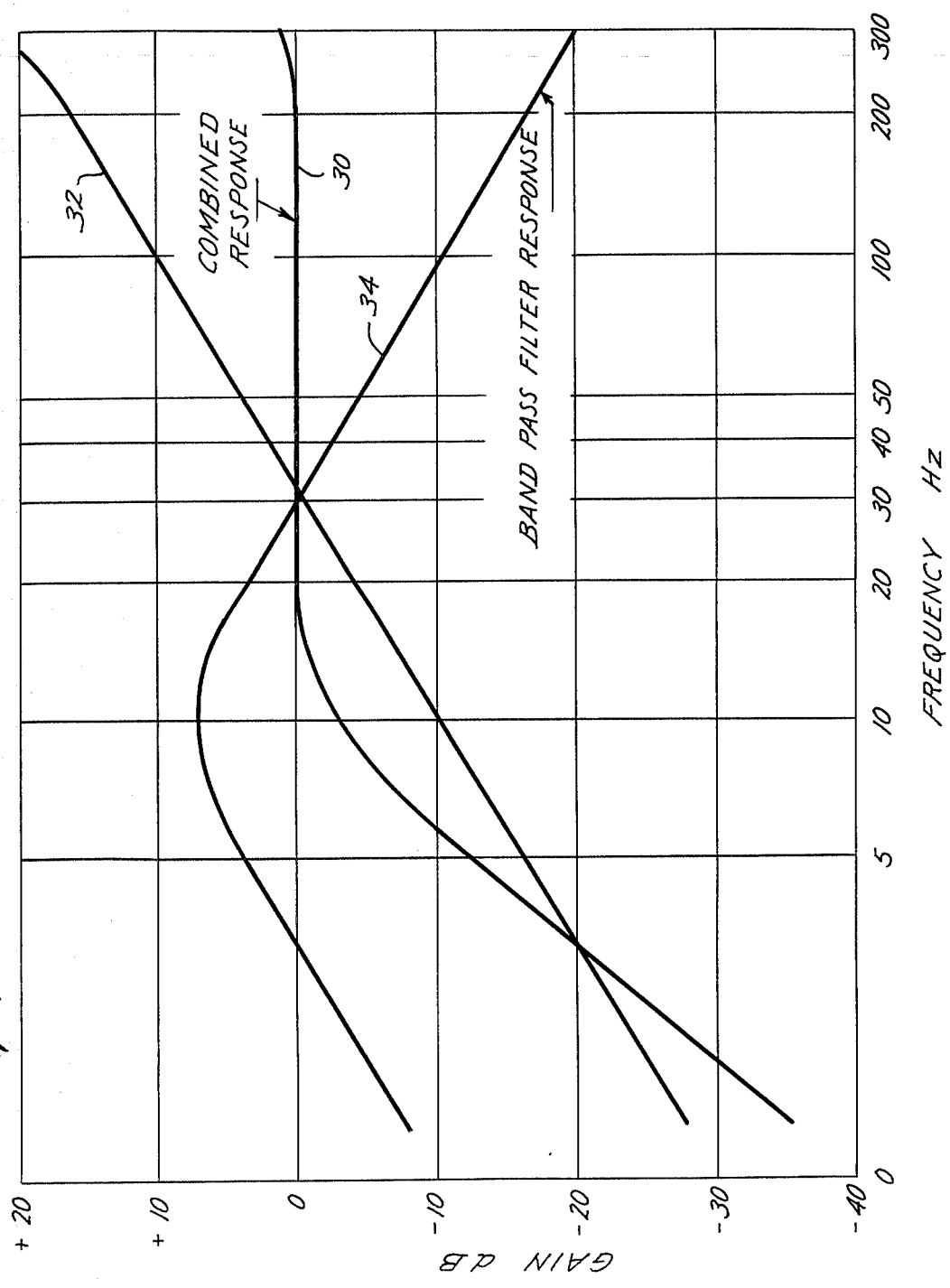

MULTI-PURPOSE SEISMIC TRANSDUCER

BACKGROUND OF THE INVENTION

1. Technical Field of the Invention

This invention lies in the field of seismic transducers and particularly velocity- and acceleration-sensitive instruments.

2. Discussion of the Prior Art

The geophysical industry, in the conduct of land seismic surveys for oil, has generally used geophones whose electrical outputs are representative of particle velocity.

Geophones as provided by suppliers of such instruments are characterized by a fixed natural or resonant frequency and are damped by a prescribed fraction of critical damping. If the geophysicist desired to resurvey a particular area using geophones having a different natural frequency, such as for the purpose of better noise cancellation or for high resolution studies, he was obliged to buy a complete new set of geophones. He had no means for altering the characteristics of his geophones. That is, the geophysicist had no convenient means for changing, in the field, the response characteristics of a given geophone.

There are of course, advantages to the use of velocity geophones such as their relatively low electrical impedance and relatively high output signal. But there are also certain disadvantages to use of a geophone such as the inflexibility of its characteristic parameters and the mechanical delicacy of the sensing element, a spring-suspended moving coil. In an actual exploration project, the geophysicist must not only carry an inventory of replacement geophones, but he may also be obliged to maintain two or three complete sets of geophones, each set having a different natural frequency with a different damping coefficient.

Recently, the use of accelerometers in place of geophones has received considerable interest. There are several advantages in the use of an accelerometer in place of a geophone: The accelerometer has a better response to higher seismic frequencies; for mechanical reasons, an accelerometer is believed to couple more efficiently to the ground; an accelerometer may be made less complex mechanically and electrically and is more rugged than is a geophone and accordingly can be considerably less expensive. An undamped accelerometer, used at frequencies below its natural frequency, has substantially no phase distortion. Finally, an accelerometer is a flexible instrument in that it can be used either as an accelerometer as such, or it can be easily tuned to match its output to the output response of any desired geophone, thereby serving as a multi-purpose seismic transducer.

If accelerometers are to replace geophones in seismic exploration, particularly in areas that were previously surveyed exclusively by use of geophones, the accelerometer output response characteristic, that is, its transfer function, must be capable of being modified to match the output or transfer function that is inherent to a selected geophone.

At first glance, it might be thought that the obvious approach entailing forming the time integral of the accelerometer output signal would yield the desired velocity signal as generated by a geophone since acceleration is the first time derivative of velocity. See for example Pavey, U.S. Pat. No. 3,281,768 or Sykes, U.S. Pat. Nos. 3,320,580 and 3,320,582. As will be seen below however, simple integration of the signal, as by an RC circuit, is not sufficient.

A seismic transducer, be it a geophone or an accelerometer, is a spring-mass system. Since the transducer is an oscillating system, it has a natural frequency. The natural frequency is defined to be that frequency at which the undamped system will oscillate when excited by a step function. At the natural or resonant frequency, an ideal frictionless system would theoretically oscillate forever at a fixed amplitude in response to a transient impulse. However, any real-world system includes some frictional or other energy-dissipative forces which tend to decrease or damp the amplitude of oscillation. Critical damping is the minimum damping required to prevent an excited system from oscillating. Generally, except for special applications, the damping force is some substantial fraction of critical.

Any spring-mass system, when operated above the natural frequency, measures displacement. When provided with a velocity-sensing device such as a coil of wire, mounted on the mass and arranged to cut a magnetic field, the system output signal is representative of particle velocity. The same spring-mass system, when operated well below its natural frequency, produces an output that is representative of particle acceleration.

In seismic exploration, geophones are of the well-known moving coil type; thus, their output signal is representative of particle velocity. Their natural frequency is usually in the range of 8-20 Hz and the damping coefficient is often set between 50% and 70% of critical damping. Above the natural frequency and for a velocity input of constant amplitude in the useful seismic frequency band, the geophone output response is substantially constant with increasing frequency. Below the natural frequency, lower frequencies are attenuated 12 dB per octave. Of the 12 dB attenuation, 6 dB may be attributed to the geophone acting as an accelerometer; the additional 6 dB attenuation results from the electrical response of the coil-mass moving in the magnetic field. The geophone output is nominally 90 degrees out of phase with the disturbing force but the phase response is non-linear up to about three times the natural frequency. Because of the non-linear phase response, for each component of a complex wave form there is a different phase angle between the actual driving force and the geophone output signal. Because the phase angles are not proportional to frequency, the combined pattern of the output signals is different from the combined signal pattern of the actual driving force.

As used in exploration work, an accelerometer consists of an inertial mass acting against or applying pressure to a piezo-electric crystal. The accelerometer is undamped and, because the crystal acts as a stiff spring, the natural frequency may be on the order of 600-700 Hz. The useful seismic frequency band lies well below the natural frequency of such an accelerometer. To a reasonable degree of accuracy the output of the accelerometer is 180 degrees out of phase with the driving force and, within the useful seismic frequency band, below the natural frequency of the accelerometer, the output signal suffers substantially no phase distortion. The attenuation rate vs frequency of the accelerometer output, when driven by a velocity source of constant amplitude, rises at a rate of 6 dB per octave over its useful range.

Piezo-electric hydrophones commonly used in seismic exploration at sea are sensitive to pressure changes in exactly the same way that the crystal in an accelerometer is sensitive to the pressure of an inertia mass. Accordingly, insofar as this invention is concerned, the response of a hydrophone is effectively the same as the response of an accelerometer.

To summarize the above discussion, it can be understood that the apparently obvious solution of simple integration of an accelerometer output will not yield a transfer function that will match the inherent transfer function of a selected geophone for the following reasons: First, the attenuation rate of the accelerometer, below the natural frequency of an exemplary geophone, is 6 dB per octave whereas the attenuation rate of the exemplary geophone itself is 12 dB per octave. Second, above the natural exemplary geophone frequency, the accelerometer output increases with frequency at the rate of 6 dB per octave whereas the geophone response in the same frequency band is substantially constant. Third, because of the non-linear geophone phase distortion, the pattern of signals derived from a geophone does not readily correlate with the pattern of integrated accelerometer signals at frequencies in the useful seismic band.

A more thorough theoretical treatment of seismic transducers may be found in chapter 12 of "Shock and Vibration Handbook" second edition, by C. M. Harris and C. E. Crede, McGraw Hill Book Co., New York, N.Y.

From the above discussion it will be appreciated that prior art accelerometers presently available cannot readily be substituted for geophones simply by integrating the accelerometer output signal.

SUMMARY OF THE INVENTION

It is an object of this invention to provide a multi-purpose seismic transducer whose output signal response characteristic or transfer function can be shaped to duplicate the transfer function inherent to any other desired seismic sensor. It is a further object of this invention to provide a multi-purpose seismic transducer whose response characteristics may be changed in the field at will.

In an embodiment of this invention, the transfer function of a first seismic sensor having a first transfer function is shaped to match the response of a second seismic sensor having a second transfer function.

In an aspect of this invention, a transfer-function shaping filter is provided. The center frequency of the shaping filter is centered at the natural frequency of a selected seismic sensor whose transfer function is to be matched. Filter parameters are designed to match the damping coefficient and phase response of the selected seismic sensor.

In another aspect of this invention, the filter parameters are selectively adjustable to match the transfer characteristics of any desired seismic sensor.

In yet another aspect of this invention the first seismic sensor is an accelerometer and the second seismic sensor is a geophone.

In a further aspect of this invention, the first seismic sensor is a hydrophone and the second seismic sensor is a geophone.

BRIEF DESCRIPTION OF THE DRAWINGS

FIG. 1 is an idealized view of a seismic survey operation,

FIG. 2 illustrates schematically the construction of a multi-purpose seismic transducer;

FIG. 3 illustrates the response characteristics of a geophone, an accelerometer and a geophone-matching filter;

DESCRIPTION OF A PREFERRED EMBODIMENT

Figure 4:
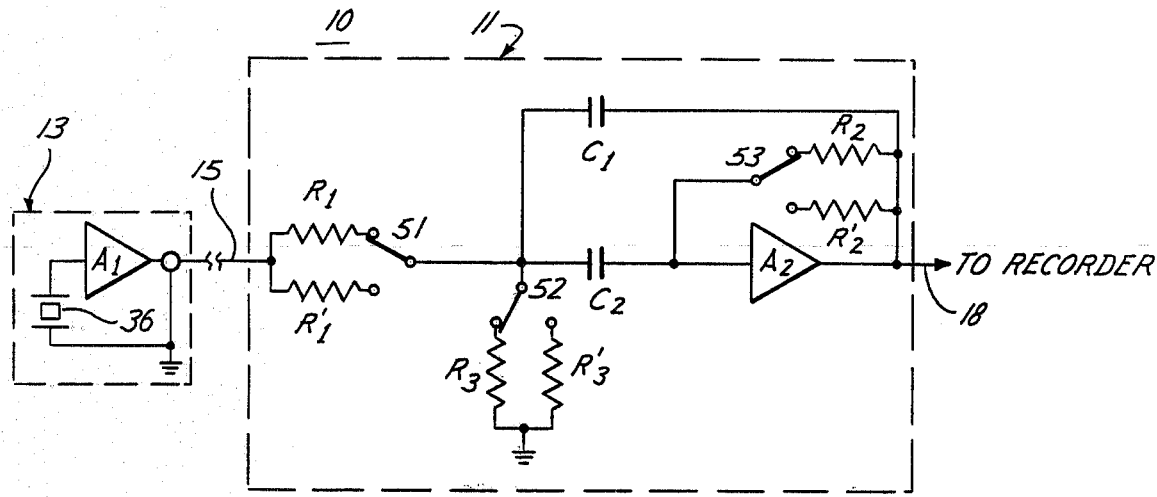
FIG. 4 is a circuit diagram of one type of transfer-function shaping filter.

Referring now to FIG. 1, a plurality of multi-purpose seismic transducers 10, 10', 10'', 10''' are laid upon the ground 12 at different locations. The transducers are connected to recording instruments 14 mounted on a truck 16 by a multiconductor cable 18. A source of acoustic energy such as a dynamite charge 20, buried in a bore hole 22, emits acoustic waves 24. The acoustic waves propagate through the earth to a reflecting layer 26 and are reflected therefrom to seismic transducers 10–10'''. The reflected acoustic waves generate constant amplitude particle motion at the earth's surface 12. Although single units are shown, it is customary to emplace a "string" or array of several such transducers at each location. The several transducers are interconnected so as to generate seismic signals for a single data channel.

A typical multi-purpose transducer 10 is illustrated schematically in FIG. 2. The complete transducer assembly consists of a case 9 resting on the ground 12. Inside case 9 is mounted a seismic sensor such as a piezo-electric accelerometer 13. In a preferred embodiment, the accelerometer consists of a container having a pair of piezo-electric ceramic disks mounted at opposite ends of the container. The container is nearly filled with a fluid inertia mass, such as mercury, which is in mechanical contact with the disks. In response to particle motion of the ground 12, the ceramic disks, pressing against the inertial mass, generate electrical signals proportional to particle acceleration. The preferred accelerometer is described in detail in my copending application Ser. No. 905,491, filed May 12, 1978 and assigned to the assignee of this invention. In addition to accelerometer 13 the multi-purpose transducer 10 includes a transfer-function-shaping element 11 that is connected to accelerometer 13 by leads 15. The output of the transfer-function shaping element 11 is connected to a pair of conductors in multiconductor cable 18. Transfer-function shaping element 11 may be a filter network, to be described later in connection with FIG. 4, for adjustably matching the output response characteristics of accelerometer 13 to the output response characteristic of a seismic sensor having a different transfer function such as a geophone. Of course, the filter can be switched out if multi-purpose transducer 10 is to be employed only as an accelerometer.

FIG. 3 is a graph showing the amplitude response functions of a selected geophone, an accelerometer and the required transfer-function shaping element. The vertical scale is marked in decibels (dB) above or below an arbitrary reference voltage. The horizontal scale is marked off in frequency in Hz (cycles per second).

Curve 30 represents the output for a geophone having a natural frequency of 10 Hz, damped 70% of critical damping. Below about 10 Hz the attenuation rate is 12 dB per octave. Rapid attenuation of lower frequencies is often desirable because certain low frequency surface waves wreak havoc upon the seismic recordings. Above 10 Hz, the geophone output is substantially constant with frequency. The geophone curve is typical of commerical instruments on the market such as the LRS-1000 geophone, made by Litton Resources Systems of Houston, Tex.

Curve 32 illustrates the response characteristics of a preferred accelerometer. This particular accelerometer is undamped and has a natural frequency of about 650 Hz. Below about 300 Hz, the attenuation rate is 6 dB per octave. Frequencies above about 300 Hz are not of interest in this example and may be filtered out by conventional low-pass filters in the recording instruments. The accelerometer was driven by a velocity source of constant amplitude. Velocity of constant amplitude means that the velocity is represented by a sinusoid whose amplitude is the same for all frequencies in the specific range of frequencies.

Curve 34 shows the response characteristics of a band-pass filter that is required to shape the accelerometer curve 32 to match geophone curve 30. The filter is an active filter having a center frequency of 10 Hz, a gain of about +10 dB and an attenuation rate of 6 dB per octave on each side of the center frequency. The 6 dB attenuation rate below 10 Hz adds to the corresponding 6 dB attenuation rate of the accelerometer. The 6 dB attenuation rate above 10 Hz, just compensates for the 6 dB rising characteristic of the accelerometer.

Construction of a suitable transfer-function shaping filter is shown in FIG. 4. The filter shown is conventional and is presented for illustrative purposes only. The circuit details form no part of this invention. An accelerometer 10, includes piezo-electric crystal elements 36 coupled to an inertia mass (not shown). The output of the crystals is fed to a unity-gain impedance matching amplifier $A_1$. The arrangement is quite conventional and would result from a combination of the accelerometer of Pavey, U.S. Pat. No. 3,281,768, FIG. 15 of the patent and impedance matching circuit 20, FIG. 1 of U.S. Pat. No. 3,569,747 to Skegel. Amplifier $A_1$ may be of any well known type such as a Motorola MC1776C operational amplifier.

Transfer-function shaping element 11 is a filter that consists of resistor networks $R_1$, $R_2$, $R_3$, capacitors $C_1$ and $C_2$ and Amplifier $A_2$ which also may be a Motorola MC1776C operational amplifier. The values of $C_1$ and $C_2$ are chosen to allow reasonable values for the resistor networks. For purposes of use in the seismic frequency band, $C_1 = C_2 = 0.1$ microfarad. The values for $R_1$, $R_2$, $R_3$ are computed from the known parameters of the geophone whose transfer functon is to be matched. Element 11 can be made tunable to match the accelerometer transfer function to any one of several different types of geophones having different natural frequencies and damping coefficients, by using two or more resistors such as $R_1$, $R_1'$ in each resistor network, selectable by switches S1, S2, S3.

Resistor values are computed as follows, assuming unity gain:

$$R_2 = \tfrac{1}{2}\pi f_n b_t C$$

$$R_1 = R_2/2$$

$$R_3 = R_2 b_t^2/(1 - 2b_t^2)$$

where
 $b_t$ = geophone damping coefficient $f_n$ = geophone natural frequency, in Hz C = Capacitance in farads.

For a geophone having a natural frequency of 10 Hz, a damping coefficient of 0.45 and assuming that $C = 0.1 \times 10^{-6}$ farads, $R_1 = 177$ K ohms, $R_2 = 354$ K ohms, $R_3 = 120$ K ohms.

If the natural frequency of another desired geophone to be matched is 20 Hz with a damping coefficient of 0.65, $R_1' = 61$ K ohms, $R_2' = 122$ K ohms, $R_3' = 334$ K ohms.

The values for R and R' as given are rounded off. Fixed resistors are shown, but continuously variable resistors could be used.

It should be understood that the phase difference between an accelerometer signal and the signal of the geophone is inherently compensated for by filter 11. This statement is true because the phase shift is defined by the undamped natural frequency and the damping coefficient.

Figure 5:
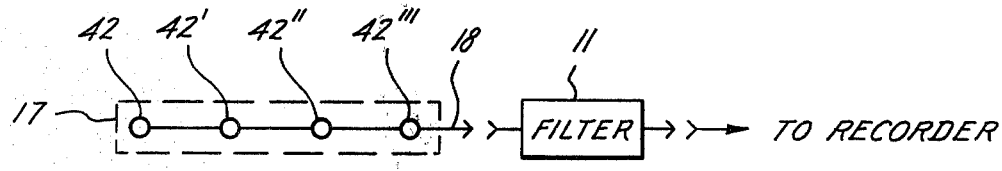
FIG. 5 shows a shaping-filter module plugged into a string of accelerometers.

In use, transfer-functon shaping element 11 may be included inside the case 9 of the multi-purpose transducer 10 as shown in FIG. 2. However, because, as was mentioned above, a string of several accelerometers may be connected together to form a single data channel, element 11 could be alternatively be mounted in a suitable container and plugged into the end of the string. In this way, only one instead of several transfer-function shaping elements per string is needed. The additional advantage is, of course, that the element 11 can be unplugged completely from the string if the accelerometers are to be used as accelerometers rather than as phantom geophones. This feature is shown in FIG. 5 where element 11 is mounted in a module that is plugged into cable 18 at the end of a string 17 of individual accelerometers 42–42'''.

As pointed out earlier, piezo-electric hydrophones are commonly used in marine surveying. In the water, particle motions of the earth at the water bottom are converted to compressional waves in the water, which are detected as seismic signals by the pressure-sensitive hydrophones. The transfer function of such a hydrophone is identical to the transfer function of an equivalent accelerometer used on land. Hence, transfer-function shaping element 11 can be used with hydrophone arrays. Such a use is particularly advantageous where a marine survey is extended shoreward towards a land area to link with a geophone survey.

Figure 6:
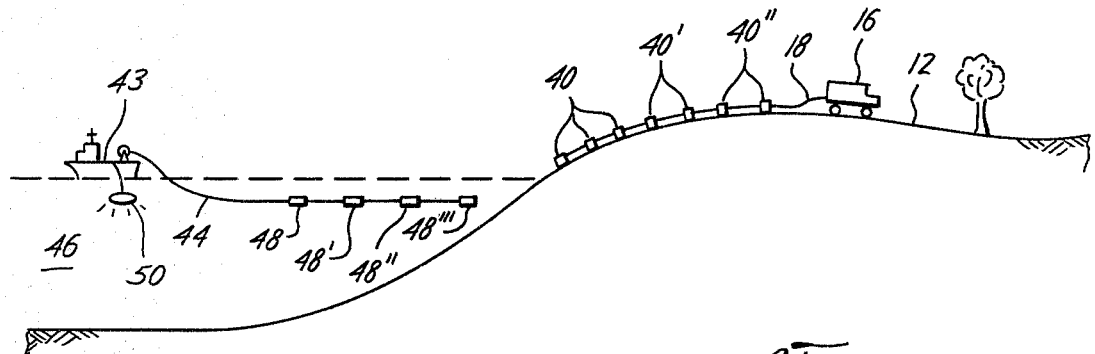
FIG. 6 shows a contiguous land and marine survey.

A land survey and a contiguous marine survey are shown in FIG. 6. In this case, the land survey is conducted using geophones 40–40'', connected to a cable 18 for conducting the geophone signals to recording truck 16. A ship 43, tows a cable 44 through water 46. Crystal hydrophones 48–48''' receive seismic signals generated by a sound source 50 also towed by ship 43. In accordance with the previous discussion, band-pass filters, connected to the hydrophones, match the transfer function of the hydrophones to the transfer function of the geophones as used on land. Accordingly the results of the two surveys, marine and land, will match without further processing. Brede, in U.S. Pat. No. 3,629,801 seeks to match the results of a marine and a land survey by cross-correlating the two sets of seismic data in a computer. However, he does not teach a means for matching the transfer function of the hydrophones to the geophone transfer function. Use of this invention precludes the necessity for expensive cross-correlation during post processing of the seismic data.

I claim as my invention:

1. An improved method for joining a land seismic survey with a marine seismic survey, the land survey being conducted using geophones having a first selected inherent transfer function, the marine survey being conducted using hydrophones having a second transfer function, comprising the step of:

shaping said second transfer function of said hydrophones to match said first transfer function of said geophones.

2. The method as defined by claim 1 wherein said second transfer function is shaped to match said first transfer function with respect to natural frequency, damping and phase angle.

3. A multi-purpose seismic transducer for sensing particle motions of the earth and for converting said particle motions to electrical signals comprising, in combination:

a first seismic sensor emplaced upon the surface of the earth for converting earth motions to electrical signals, said first seismic sensor having a first transfer function; and means for receiving signals from said first seismic sensor and for shaping the first transfer function to match the inherent transfer function of a geophone having a second transfer function, said first sensor being an accelerometer.

4. The multipurpose seismic transducer as defined in claim 3 wherein:

a plurality of accelerometers are electrically interconnected together in a string to provide a single output signal; and said transfer-function shaping means receives the combined output signal from the accelerometer string to match the transfer function of the inherent accelerometer string to the transfer function of a seismic sensor having a different transfer function.

5. A multipurpose seismic transducer for sensing particle motions of the earth and for converting said particle motions to electrical output signals, comprising in combination:

an accelerometer having an electrical output;

a filter network which, when applied to the electrical output of said accelerometer, substantialy reproduces the electrical output of a selected geophone.

6. The multipurpose seismic transducer as defined by claim 5 wherein said filter network is designed to match the electrical output of said accelerometer to the electrical output of the selected geophone with respect to natural frequency, damping, amplitude and phase angle.

7. The multipurpose seismic transducer as defined by claim 5 wherein said filter network is adjustable for reproducing the electrical outputs of any one of several different geophones with respect to natural frequency, damping, amplitude and phase angle.

8. An improved method of seismic exploration with transducers for detecting particle motions of the earth comprising the steps of:

receiving seismic waves with an accelerometer; and shaping the transfer function of the accelerometer to match the inherent transfer function of a geophone with respect to natural frequency, damping, amplitude and phase angle.

9. A multi-purpose seismic transducer for sensing particle motions of the earth and for converting said particle motions to electrical signals comprising, in combination:

a first seismic sensor for converting earth motions to electrical signals, said first seismic sensor having a first transfer function; and means for receiving signals from said first seismic sensor and for shaping the first transfer function to match the inherent transfer function of a geophone having a second transfer function, said first sensor being a hydrophone.

10. An improved method of seismic exploration with transducers for detecting particle motions of the earth comprising the step of:

receiving seismic waves with a hydrophone; and shaping the transfer function of the hydrophone to match the inherent transfer function of a geophone with respect to natural frequency, damping, amplitude and phase angle.

* * * * *